(12) United States Patent
Haba et al.

(10) Patent No.: US 7,708,313 B2
(45) Date of Patent: May 4, 2010

(54) PLASTIC BASKET COUNTERMEASURE FOR DOOR SIDE IMPACT

(75) Inventors: Charles A. Haba, Troy, MI (US);
Chaman Sahu, Troy, MI (US); Behrooz Mehdian, Ypsilanti, MI (US);
Mohammad A. Naim, Canton, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 463 days.

(21) Appl. No.: 11/217,737

(22) Filed: Sep. 1, 2005

(65) Prior Publication Data

US 2007/0046010 A1 Mar. 1, 2007

(51) Int. Cl.
*B60R 21/04* (2006.01)
(52) U.S. Cl. .................................... 280/751
(58) Field of Classification Search ............... 280/751; 296/189, 35.2, 146.5, 146.6, 146.7
See application file for complete search history.

(56) References Cited

U.S. PATENT DOCUMENTS

| | | | |
|---|---|---|---|
| 3,936,090 A * | 2/1976 | Aya et al. | 296/146.6 |
| 4,109,959 A | 8/1978 | Barecki et al. | |
| 4,192,545 A | 3/1980 | Higuchi et al. | |
| 4,786,100 A * | 11/1988 | Kleemann et al. | 296/146.6 |
| 4,852,704 A * | 8/1989 | Brockenbrough et al. | 188/376 |
| 4,969,680 A * | 11/1990 | Shimoda | 296/146.6 |
| 5,033,593 A * | 7/1991 | Kazuhito | 188/377 |
| 5,238,286 A | 8/1993 | Matsuhiro et al. | |
| 5,273,314 A | 12/1993 | Sakakibara | |
| 5,447,360 A | 9/1995 | Hewko et al. | |
| 5,456,494 A | 10/1995 | Witkovsky | |
| 5,516,145 A | 5/1996 | Williams et al. | |
| 5,577,770 A | 11/1996 | Sinner et al. | |
| 5,586,797 A * | 12/1996 | Hirahara et al. | 296/146.6 |
| 5,664,801 A | 9/1997 | Gray et al. | |
| 5,716,094 A | 2/1998 | Bhalsod et al. | |
| 5,775,723 A | 7/1998 | Dede et al. | |
| 5,826,946 A | 10/1998 | Matthews et al. | |
| 5,918,943 A | 7/1999 | Mitschelen et al. | |
| 5,934,733 A | 8/1999 | Manwaring | |
| 6,027,167 A | 2/2000 | Blomdell et al. | |
| 6,074,004 A | 6/2000 | Carmichael | |
| 6,131,950 A | 10/2000 | Schrofer | |
| 6,196,588 B1 | 3/2001 | Sugawara | |
| 6,196,619 B1 * | 3/2001 | Townsend et al. | 296/146.6 |
| 6,213,504 B1 | 4/2001 | Isano et al. | |
| 6,296,277 B1 | 10/2001 | Bittinger et al. | |
| 6,299,208 B1 | 10/2001 | Kasahara et al. | |
| 6,378,934 B1 | 4/2002 | Palazzolo et al. | |
| 6,554,356 B1 | 4/2003 | Crose | |
| 6,631,940 B2 * | 10/2003 | Dauvergne et al. | 296/146.6 |
| 6,692,071 B2 | 2/2004 | Fowler | |
| 6,698,819 B1 | 3/2004 | Mozer et al. | |
| 6,786,508 B2 | 9/2004 | Fraley et al. | |
| 6,805,397 B1 * | 10/2004 | Chernoff et al. | 296/146.2 |
| 6,857,688 B2 | 2/2005 | Morrison et al. | |
| 6,857,698 B2 | 2/2005 | Saberan et al. | |
| 6,921,128 B2 | 7/2005 | Davis, Jr. et al. | |
| 7,090,293 B2 | 8/2006 | Saberan et al. | |

(Continued)

*Primary Examiner*—Faye M. Fleming
(74) *Attorney, Agent, or Firm*—Grossman, Tucker, Perreault & Pfleger, PLLC

(57) ABSTRACT

An automobile door bracket includes an attachment section and a corrugated section. The door bracket is placed within an automobile door assembly to function as a side impact countermeasure.

18 Claims, 3 Drawing Sheets

U.S. PATENT DOCUMENTS

| | | | |
|---|---|---|---|
| 7,125,067 B2 * | 10/2006 | Bonnett et al. | 296/146.6 |
| 2002/0038965 A1 | 4/2002 | Palazzolo et al. | |
| 2003/0151279 A1 | 8/2003 | Fowler | |
| 2003/0173763 A1 | 9/2003 | Yamazaki et al. | |
| 2003/0189357 A1 * | 10/2003 | Patberg et al. | 296/146.6 |
| 2003/0218356 A1 | 11/2003 | Emerling et al. | |
| 2005/0242634 A1 | 11/2005 | Serber | |
| 2005/0264053 A1 | 12/2005 | Saberan et al. | |
| 2006/0028047 A1 | 2/2006 | Adams et al. | |

* cited by examiner

PLASTIC BASKET COUNTERMEASURE FOR DOOR SIDE IMPACT

BACKGROUND OF THE INVENTION

1. Field of the Invention

The present invention relates to an automobile door assembly component that functions as a countermeasure to vehicular side impacts.

2. Background Art

Governmental regulations provide safety specifications for many automotive components. The National Highway Traffic Safety Administration ("NHTSA") is one government agency that sets and enforces safety performance standards for motor vehicles and motor vehicle equipment. In addition to government imposed standards, consumer desires also place pressure on automobile manufacturers and suppliers to increase the safety of motor vehicles. Improved vehicle designs regarding impact resistance having undoubtedly saved many lives and decreased serious injury. Improvements in side impact resistance has attracted significant attention due to the enhanced potential of injury during side impact. FMVSS 214 is a governmental standard promulgated by NHTSA regarding side impact protection.

FIG. 1 provides a side view of a door assembly that utilizes foam for side impact resistance. In FIG. 1, the trim panel is removed in order to allow viewing of the relevant structures. Door assembly 10 includes foamed pad 12 which is attached to door bolster 14 and upper door frame 16. Typically, an adhesive is used for this attachment. The position in door assembly 10 at which foamed pad 12 is placed is specified by governmental regulation. In general, this position is at a position that a vehicle occupant is most likely to strike during side impact. FIG. 2 provides an illustration of the performance of foamed pad 12 after a chest impact. Although foamed pad 12 is clearly compressed, the dependence of the compression as a function of the force is subject to regulation and to specification by the automobile manufacturers. Displacement $d_1$ provides a measure of the amount of compression that foamed pad 12 has undergone. Specifically, displacement $d_1$ is the distance the surface 18 of foamed pad 12 has moved during impact relative to surface 20. In FIG. 2, the original position of surface 18 is shown as a phantom after impact with surface 18' indicating the actual position after impact. Displacement $d_1$ may be determined as an average for foamed pad 12 or as a measure value for any predetermined position on foamed pad 12. In general, there is a continuous relationship between the reaction force and the displacement such that it is required that the reaction force experienced by the occupant at any point through displacement $d_1$ be less than a specified value. This force value for the door trim level is usually specified by the OEM. For example if force requirement is below 8 N, throughout 10 mm displacement on the force displacement curve the force can never go higher than 8 N. In addition to the force being low, the door trim panel has to absorb its share of the energy generated due to impact. At a certain displacement, a higher force value indicates higher energy absorption which goes against the requirement to keep force low. These two conflicting requirements are address in the present invention by bracket design.

Although the prior art methods of countering side impacts have worked well, there are several issues requiring improvement. As stated above, such foamed layers are typically attached with adhesives. Such adhesives tend to allow somewhat imprecise positioning while requiring time to cure. Moreover, foamed pads tend to be expensive because such pads are formed from specially tailored formulations that cure into pads with the specified impact resistance.

Accordingly, there is a need in the prior art for improved side impact countermeasures.

SUMMARY OF THE INVENTION

The present invention overcomes one or more problems of the prior art by providing in at least one embodiment an automobile door bracket for placement in an automobile door. The bracket of this embodiment is advantageously included in automobile door assemblies to function as a side impact countermeasure (i.e., provides resistance to a side impact) that meet governmental standards and vehicle manufacturers standards. The door bracket of this embodiment includes an attachment section and a corrugated section.

BRIEF DESCRIPTION OF THE DRAWINGS

The following detailed description of the embodiments of the present invention can be best understood when read in conjunction with the following drawings, where like structure is indicated with like reference numerals and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of the embodiments of the present invention.

DETAILED DESCRIPTION OF THE PREFERRED EMBODIMENT(S)

The following description of the preferred embodiments is merely exemplary in nature and is in no way intended to limit the invention, its application, or uses. Reference will now be made in detail to presently preferred compositions, embodiments and methods of the present invention, which constitute the best modes of practicing the invention presently known to the inventors. The figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for the claims and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and to normal grammatical variations of the initially defined abbreviation; and, unless expressly stated to the contrary, measurement of a property is determined by the same technique as previously or later referenced for the same property.

As used herein, "corrugated bracket" refers to a fixture having alternating ridges and grooves. With regards to the present invention, the corrugated bracket is designed for inclusion in an automobile door assembly usually by attachment to a door bolster, door trim panel, or side trim panel.

As used herein, "corrugation" refers to a ridge and groove in a surface.

Figure 3:
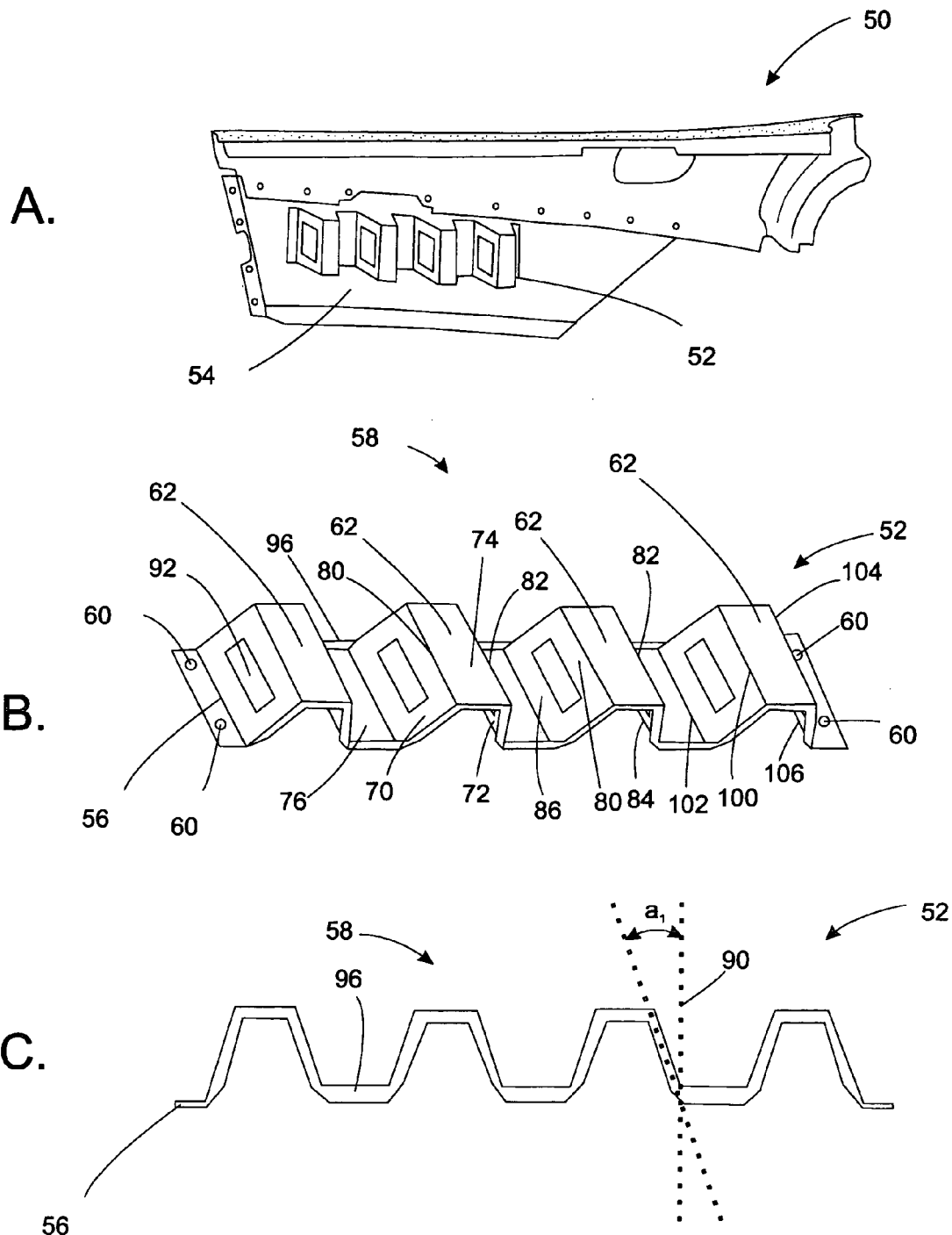
FIG. 3A is a side view of a door assembly that includes a door bracket of one embodiment of the present invention.
FIG. 3B is a perspective view of an embodiment of the door bracket of the present invention.
FIG. 3C is a side view of an embodiment of the door bracket of the present invention.

With reference to FIGS. 3A, B, and C provides illustrations of the automobile door bracket of a first embodiment of the invention. FIG. 3A provides a side view of a door assembly that includes the door bracket. In FIG. 3A, the trim panel is removed to allow viewing of the bracket. Automobile door assembly 50 includes automobile door bracket 52 which is attached to support structure of door assembly 50. For example, bracket 52 is attached to door bolster 54. FIG. 3B is a perspective view of automobile door bracket 5, while FIG. 3C is a side view. Bracket 52 includes attachment section 56 and corrugated section 58. Attachment section 56 is utilized to attach bracket 52 to door bolster 54 of automobile door assembly 50. It should be appreciated that the design of the bracket of this embodiment takes into account the two conflicting requirements imposed by side impact specifications as set forth above. A first requirement is that the reaction force experienced by a vehicle occupant at any point through displacement $d_1$ be less than a specified value. Secondly, the door trim panel must absorb its share of the energy generated due to impact. At a certain displacement, a higher force value would indicate higher energy absorption which goes against the requirement to keep force low.

In a variation of the present embodiment, attachment section 56 and corrugated section 58 are continuously being formed into a single piece (i.e, monolithic). Moreover, attachment section 56 and corrugated section 58 may be formed from a variety of materials such as plastics, metals, and combinations thereof. Plastics are particularly useful for forming attachments section 56 and corrugated section 58. When plastics are used, automobile door brackets are advantageously made by injection molding. Suitable plastics include thermoplastic resins. Examples of useful thermoplastic resins include thermoplastic olefins, polyvinyl chloride, polypropylene, and combinations thereof. More specific examples from which door bracket 52 may be formed are homopolymers and copolymers of polyethylene, homopolymers and copolymers of polypropylene, thermoplastic olefins, thermoplastic urethanes, polycarbonate, acrylonitrile butadiene styrene, mixed acrylonitrile butadiene styrene and polycarbonate, and combinations thereof. In a further refinement of this embodiment corrugated section 58 and attachment section 56 are from about 1.5 to about 4 mm thick and the corrugated section comprises a plurality of corrugations separated by a distance of about 50 to about 200 mm.

Still referring to FIGS. 3A, B, and C, corrugated section 58 comprising a sequence of corrugations, the door bracket being positionable in automobile door assembly 50 proximate to a position contacted by a vehicle occupant during an impact to the side of a vehicle. Attachment of bracket 52 in door assembly 50 is accomplished using attachment section 56. Virtually any method or attachment may be used. In one variation, bracket 52 is attached via heat staking by passing suitable plastic pegs through holes 60. Examples of other attaching methods include screwing bracket 52 on a structure in door assembly 50, vibration welding, sonic welding, and the like.

Corrugated section 58 comprises a plurality of corrugations 62. In a variation of the present embodiment each of corrugations 62 includes first side wall 70, second side wall 72, top wall 74, and bottom wall 76. Top wall 74 is attached to first end 80 of first side wall 70 and first end 82 of second side wall 72. Similarly, bottom wall 76 is attached to second end 84 of second side wall 72 and second end 86 of side wall from an adjacent corrugation.

In yet another variation of the present embodiment, first side wall 70 and second side wall 72 of one or more corrugations 62 are angled relative to vertical plane 90 by angle $a_1$. Typically, angle $a_1$ is from about 5 to about 30 degrees. Angle $a_1$ is a useful parameter in adjusting the stiffness of bracket 52 in order to meet vehicle manufacturers specifications.

In still another variation of the present invention, corrugated section 58 defines a plurality of cut out regions 92. In a first refinement of this variation about 0% to about 80% of the surface area of the corrugated section comprises cut out regions. In another variation, about 40% to about 80% of the surface area of the corrugated section comprises cut out regions.

In still another variation of the present embodiment, automobile door bracket 52 further includes flange 96. Flange 96 is attached to one or more edges of the corrugated section 58 and may extend to the edges of attachment section 56. Flange 96 ensures that the deformation of bracket 52 during a side impact is not limited to bending about edges 100, 102, 104, 106. Instead, bracket 52 tends to deform about the center and adjacent regions of side walls 70, 72.

Figure 2:
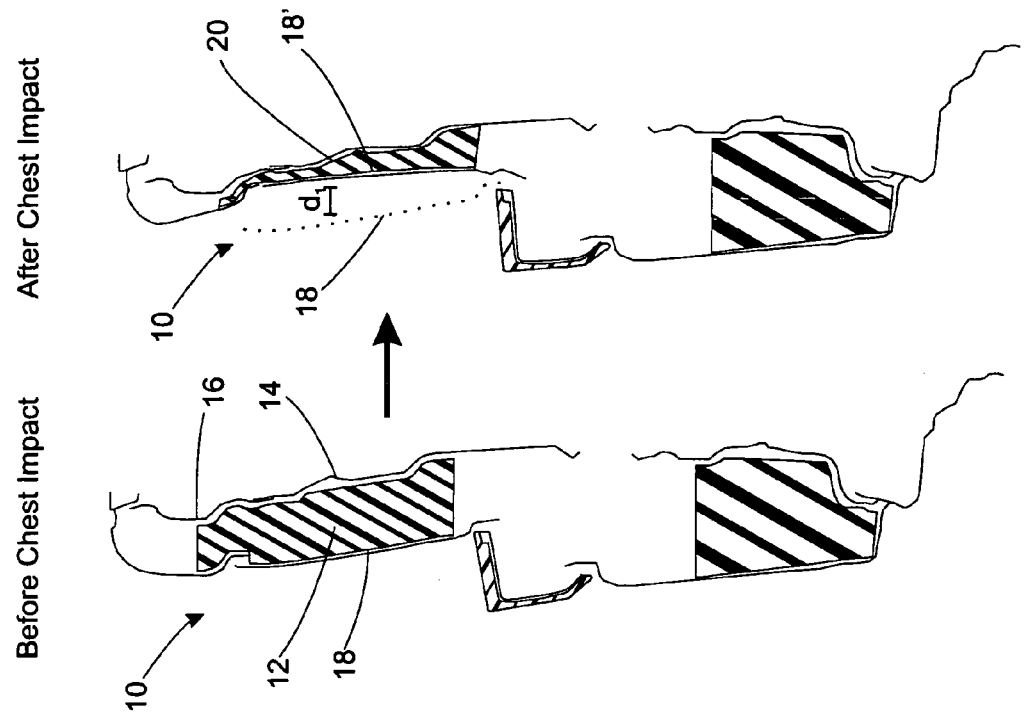
FIG. 2 is an illustration of a side impact in a door assembly having a foamed pad as a countermeasure.
Figure 1:
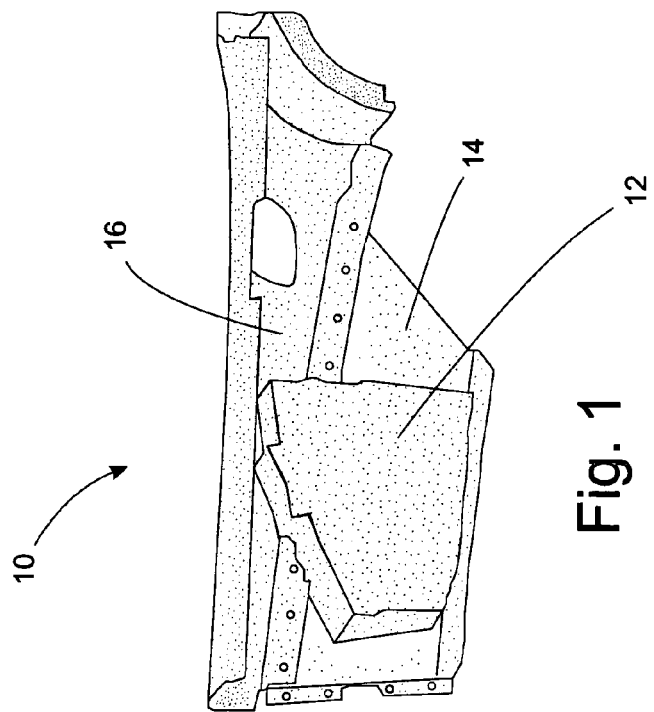
FIG. 1 is a side view of an automobile door assembly (with the trim panel removed) illustrating having a foamed pad as a countermeasure.
Figure 4:
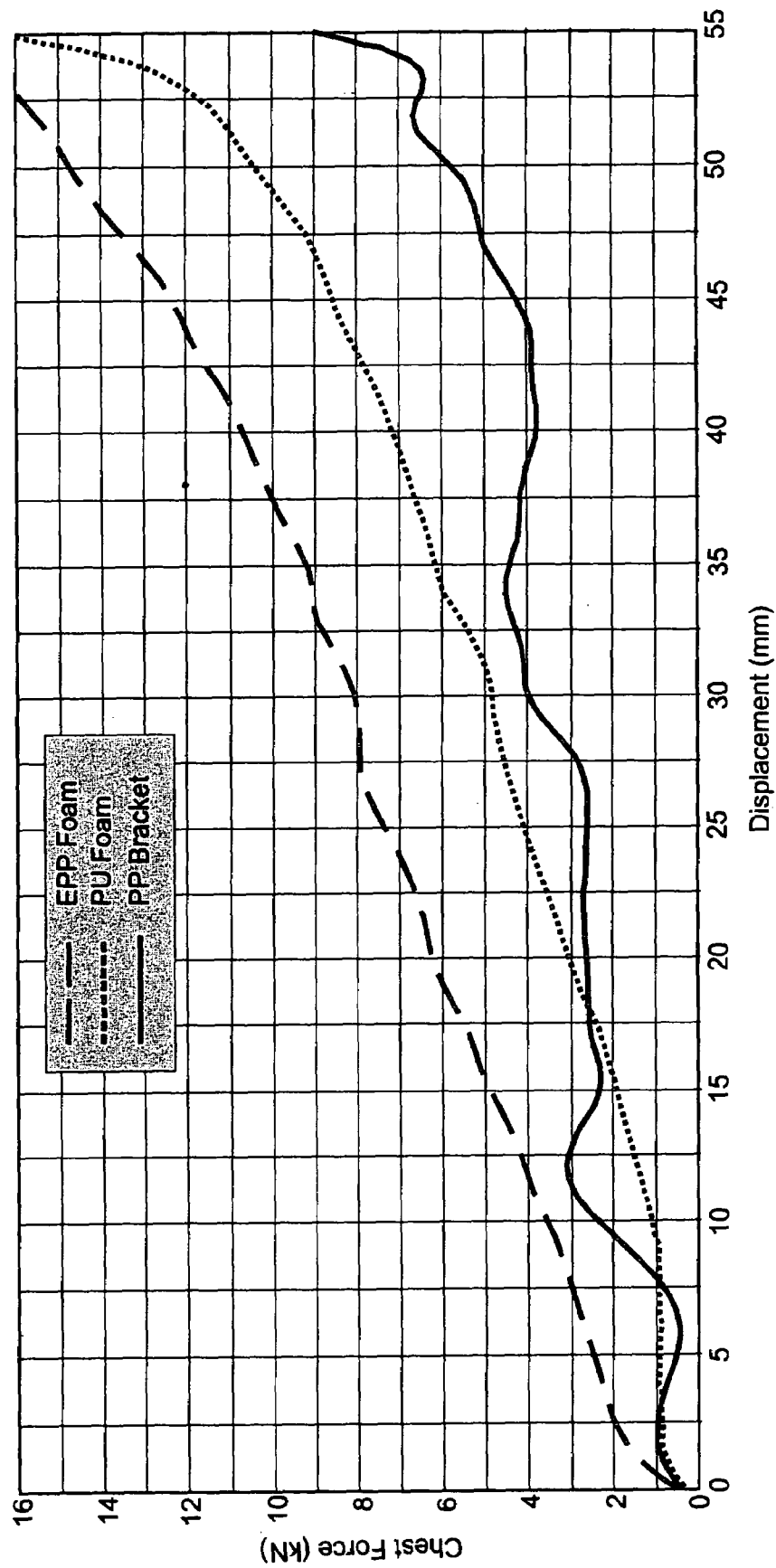
FIG. 4 is a plot of the chest force versus the displacement for a EPP foam countermeasure, a PU foam countermeasure, and the bracket countermeasure of an embodiment of the invention.

With reference to FIG. 4, a series of plots comparing the side impact performance of the bracket of the present invention (made from polypropylene ("PP") to polyurethane ("PU") and to expanded polypropylene ("EPP") foam countermeasures are provided. In FIG. 4, the chest force (i.e., the force of a vehicle occupants chest striking a door assembly at the position at which the prior art foamed pads or the bracket of the invention is located) is plotted as a function of the displacement $d_1$ as defined above for FIG. 2. The bracket of the invention is observed to have a maximum reaction force of 6000 N through 50 mm displacement. Moreover, for impact forces of about 2000 N, the displacement is less than 10 mm. For displacements from about 20 mm to about 50 mm, the bracket of the invention is able to develop a given displacement with less force than PU and EPP samples.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An automobile door bracket for a vehicle, said bracket having alternating ridges and grooves forming a corrugated section and said vehicle having a longitudinal axis extending fore-aft therein, comprising:
   a) an attachment section for attachment to a structure of an automobile door assembly; and
   b) said corrugated section having a surface area and comprising a sequence of corrugations, said door bracket being positionable in said automobile door assembly proximate to a position contacted by a vehicle occupant during an impact to the side of said vehicle; and
   a flange on one or more edges of said corrugated section such that said door bracket deforms at a location where impacted by said occupant during an impact to said side of said vehicle, wherein said corrugations include side walls wherein said alternating ridges and grooves including said side walls extend in a direction different from said vehicle longitudinal axis wherein said door bracket consists of plastic material.

2. The automobile door bracket of claim 1 wherein said attachment section and said corrugated section are continuous and monolithic.

3. The automobile door bracket of claim 1 wherein said attachment section and said corrugated section consists of injection molded thermoplastic material.

4. The automobile door bracket of claim 1 wherein said corrugated section comprises a plurality of corrugations each corrugation having:
   a first side wall;
   a second side wall;
   a top wall attached to a first end of the first side wall and a first end of the second side wall; and
   a bottom wall attached to a second end of the second side wall and a second end of a side wall from an adjacent corrugation.

5. The automobile door bracket of claim 4 wherein said first side wall and said second side wall of one or more corrugations are angled relative to a vertical plane extending from said bottom wall to said top wall.

6. The automobile door bracket of claim 5 wherein said first side wall and said second side wall are angled relative to said vertical plane with an angle from about 5 to about 30 degrees.

7. The automobile door bracket of claim 1 wherein said corrugated section is from about 1.5 to about 4 mm thick and said corrugated section comprises a plurality of corrugations separated by a distance of about 50 to about 200 mm.

8. The automobile door bracket of claim 1 wherein from about 0% to about 80% of said surface area of said corrugated section comprises cut out regions.

9. An automobile door assembly comprising said door bracket of claim 1.

10. The automobile door bracket of claim 1 wherein said door bracket is attached to a door bolster, door trim panel, or side trim panel.

11. The automobile door bracket of claim 1 wherein one or more of said side walls include a cut-out section.

12. A plastic automobile door bracket having alternating ridges and grooves forming a plastic corrugated section comprising:
   a) a plastic attachment section for attachment to a structure of an automobile door assembly of a vehicle, said vehicle having a longitudinal axis extending fore-aft therein; and
   b) said plastic corrugated section continuous with said attachment section and having a surface area, said corrugated section comprising a sequence of adjacent corrugations, each corrugation comprising:
   a first side wall including a first cut out section;
   a second side wall including a second cut out section;
   a top wall attached to a first end of said first side wall and to a first end of said second side wall;
   a bottom wall attached to a second end of said second side wall and to a second end of a side wall from an adjacent corrugation, said door bracket being positionable in said automobile door assembly proximate to a position contacted by a vehicle occupant during an impact to the side of a vehicle, said vehicle having a longitudinal axis; and
   a flange on one or more edges of the corrugated section such that the door bracket deforms at a location where impacted by said occupant during an impact to said side of said vehicle wherein said alternating ridges and grooves including said side walls extend in a direction different from said vehicle longitudinal axis.

13. The automobile door bracket of claim 12 wherein said first side wall and said second side wall are angled relative to a vertical plane extending from said bottom wall to said top wall.

14. The automobile door bracket of claim 13 wherein said first side wall and said second side wall are angled relative to said vertical plane with an angle from about 5 to about 30 degrees.

15. The automobile door bracket of claim 12 wherein said corrugated section is from about 1.5 to about 4 mm thick and said corrugated section comprises a plurality of corrugations separated by a distance of about 50 to about 200 mm.

16. The automobile door bracket of claim 12 wherein from about 0% to about 80% of said surface area of said corrugated section comprises cut out regions.

17. An automobile door assembly comprising said door bracket of claim 12.

18. The automobile door bracket of claim 12 wherein said door bracket is attached to a door bolster, door trim panel, or side trim panel.

* * * * *

UNITED STATES PATENT AND TRADEMARK OFFICE
CERTIFICATE OF CORRECTION

PATENT NO. : 7,708,313 B2  Page 1 of 1
APPLICATION NO. : 11/217737
DATED : May 4, 2010
INVENTOR(S) : Charles A. Haba et al.

It is certified that error appears in the above-identified patent and that said Letters Patent is hereby corrected as shown below:

On the title page, item (54), in "Title", in column 1, line 1, delete "BASKET" and insert -- BRACKET --, therefor.

On the title page, item (75), in "Inventors", in column 1, line 4, delete "Mohammad" and insert -- Mohammed --, therefor.

In column 1, line 1, delete "BASKET" and insert -- BRACKET --, therefor.

Signed and Sealed this

Sixteenth Day of November, 2010

David J. Kappos
*Director of the United States Patent and Trademark Office*